United States Patent [19]

Meinhardt et al.

[11] 4,042,513
[45] Aug. 16, 1977

[54] CONCENTRATES OF N-SUBSTITUTED MORPHOLINES

[75] Inventors: Norman Anthony Meinhardt, Lyndhurst; Robert Widmer, Painesville, both of Ohio

[73] Assignee: The Lubrizol Corporation, Wickliffe, Ohio

[21] Appl. No.: 598,961

[22] Filed: July 24, 1975

Related U.S. Application Data

[63] Continuation-in-part of Ser. No. 480,767, June 19, 1974, and Ser. No. 562,732, March 27, 1975, abandoned.

[51] Int. Cl.² .............................................. C10M 1/38
[52] U.S. Cl. .............................. 252/47.5; 252/51.5 R
[58] Field of Search ........................ 252/47.5, 51.5 R

[56] References Cited

U.S. PATENT DOCUMENTS

| | | | |
|---|---|---|---|
| 2,236,168 | 3/1941 | Dietrich | 252/47.5 X |
| 2,239,841 | 4/1941 | Cook | 252/51.5 R X |
| 2,384,002 | 9/1945 | Bayes | 252/47.5 X |
| 2,439,734 | 4/1948 | Himel et al. | 252/47.5 X |
| 2,530,070 | 11/1950 | Morris et al. | 252/47.5 X |
| 2,644,819 | 7/1953 | Dazzi | 252/47.5 X |
| 2,687,377 | 8/1954 | Stewart et al. | 252/51.5 R |
| 2,687,378 | 8/1954 | Goldschmidt et al. | 252/51.5 R |
| 3,156,687 | 11/1964 | Andersen et al. | 44/63 X |
| 3,311,558 | 3/1967 | Prizer et al. | 252/47.5 |
| 3,476,753 | 11/1969 | Hansen | 252/47.5 X |

*Primary Examiner*—Delbert E. Gantz
*Assistant Examiner*—Andrew H. Metz
*Attorney, Agent, or Firm*—James W. Adams, Jr.; Daniel N. Hall

[57] ABSTRACT

Concentrates of N-substituted morpholines of the formula $O(CH_2CH_2)_2NR'YR''$, wherein R' is a divalent organic radical of at least one to about 30 carbon atoms, Y

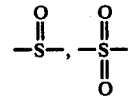

or $-NH^3-$, $R^3$ is a hydrogen atom or a hydrocarbyl radical of at least one carbon atom and R'' is a monovalent hydrocarbon radical of at least 15 carbon atoms, are useful as additives for hydrocarbyl products. Particularly preferred embodiments of the invention include concentrates wherein Y is

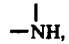

R' is 1,3-propylene and R'' is a hydrocarbyl group of at least about forty carbon atoms. These concentrates have utility as, for example, additives for lubricant compositions.

7 Claims, No Drawings

CONCENTRATES OF N-SUBSTITUTED MORPHOLINES

REFERENCE TO RELATED APPLICATIONS:

This application is a continuation-in-part of U.S. Ser. No. 480,767, filed June 19, 1974 and U.S. Ser. No. 562,732, filed Mar. 27, 1975, now abandoned.

FIELD OF THE INVENTION

This invention relates to additive concentrates. More particularly it concerns concentrates of N-substituted morpholines having at least one hydrocarbyl group of at least 15 carbon atoms.

BRIEF DESCRIPTION OF THE PRIOR ART

U.S. Pat. Nos. 3,275,554; 3,438,757; 3,454,555; 3,484,859; 3,575,804; 3,753,670; and 3,775,433 disclose lubes and fuels containing reaction products formed from halogenated polyolefins and mono- or polyamines including certain heterocyclic amines.

French application 2,143,128 discloses high molecular weight polyamines wherein at least one amino group is substituted with one or more hydroxyalkyl groups.

SUMMARY OF THE INVENTION

Concentrates of a new class of N-substituted morpholines have now been found which are particularly useful as additives for lubricants. These N-substituted morpholines are of the formula $O(CH_2CH_2)_2NR'YR''$, wherein $R'$ is a divalent organic radical of at least one to about 30 carbon atoms, $Y$ is $-O-$, $-S-$,

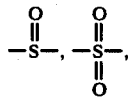

or $-NR^3-$, $R^3$ being a hydrogen atom or a hydrocarbyl radical of at least one carbon atom, and $R''$ is a monovalent hydrocarbyl radical of at least 15 carbon atoms.

DESCRIPTION OF THE INVENTION

The $R'$ group in the afore-described N-substituted morpholines is a divalent organic radical of at least one to about 30 carbon atoms, preferably one to about six carbon atoms; more preferably, it is an aliphatic radical of one to about three carbon atoms. In its broadest aspect the $R'$ group can be hydrocarbyl or hydrocarbyl interrupted with $Y$ groups. It should be noted that when the term "hydrocarbyl" is used in describing a radical or group in this specification and the appended claims it is intended also to embrace substantially hydrocarbyl groups unless expressly stated to the contrary. Substantially hydrocarbyl groups are those hydrocarbyl groups which are substituted with non-hydrocarbyl substituents (such as those enumerated below) which do not substantially affect the hydrocarbyl character and nature of the group in the context of this invention. Such groups would be considered to be within the scope of the term hydrocarbyl by the skilled worker in the art to which the invention pertains.

For example, it is obvious that a $C_{20}$ alkylene group and a $C_{20}$ alkylene group substituted with a methyl mercapto or methoxy group would be substantially similar in their properties with regard to their use in this invention and would, in fact, be recognized as equivalents by one of ordinary skill in the art. Non-limiting examples of substituents that do not significantly alter the hydrocarbyl nature of the hydrocarbyl groups of this invention include the following:

ether (especially hydrocarbyloxy and particularly alkoxy groups of up to 10 carbon atoms)
nitro
cyano
hydroxy
fluoro (e.g., monofluoro, trifluoromethyl, etc.)
aromatic halo (e.g., a halogen atom bonded directly to a carbon atom of an aromatic ring)
thioether (especially $C_1$—$C_{10}$ alkyl thioethers)
sulfonyl ($-SO_2-$)
sulfinyl ($-SO-$)

Other such non-hydrocarbyl groups will be apparent to those of skill in the art.

When such non-hydrocarbyl substituents are present in a hydrocarbyl radical or group of the present invention there will generally be no more than two such substituents for every 10 carbon atoms in the hydrocarbyl radical or group; preferably, no more than one for each 10 carbon atoms. Generally, however, it is preferred that no such substituents be present and the hydrocarbyl radicals and groups of the present invention be purely hydrocarbyl; that is, those without non-hydrocarbyl substituents. Ordinarily, the hydrocarbyl radicals and groups will be free from ethylenic or acetylenic unsaturation.

Exemplary of purely hydrocarbyl $R'$ radicals or groups are the saturated and unsaturated aliphatic divalent groups of one to 30 carbon atoms such as methylene, ethylene, 1,2-propylene, 1,3-propylene (i.e., trimethylene ) 1,2-n- butylene, 1,3-isobutylene, 1,4-pentylene, 1,3-hexylene, 1,2- dodecylene, 1,8-octadecylene, 1,2-butadienyl, 1,4-butadienyl, 1,2,dec-5-6-enyl, etc. Examples of saturated and unsaturated alicyclic radicals or groups include 1,2-cyclohexyl, 1,4- cyclopentyl,1,8-cyclooctyl, 1,3cyclohexadienyl, 1,2-cyclopentadienyl, etc. Examples of aromatic divalent $R'$ radicals or groups include, 1,2-phenylene, 1,4-phenylene, 2,5-toluene, 1,8-naphthalylene etc. Examples of groups wherein $R'$ is substantially hydrocarbyl have been given above. For example, $R'$ can be one of the following:

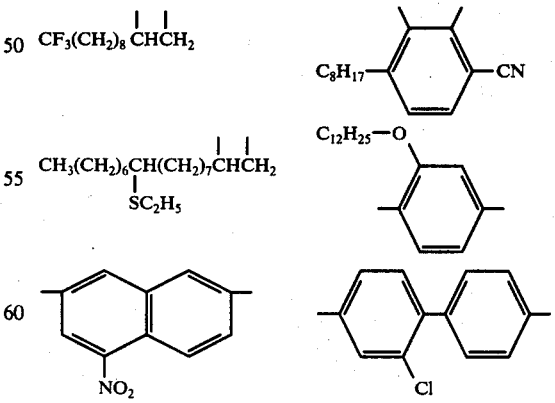

etc.

As noted above, $R'$ can be a hydrocarbyl radical interrupted by the afore-described $Y$ groups. Usually such $R'$ radicals contain between one and about six $Y$ groups. Examples are polyoxyalkylene groups wherein the alkylene group contains one to about six carbon atoms and the corresponding sulfur,

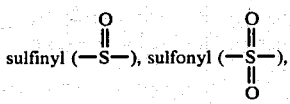

and amino analogs

Further examples of R' when it is an interrupted hydrocarbyl group are as follows:

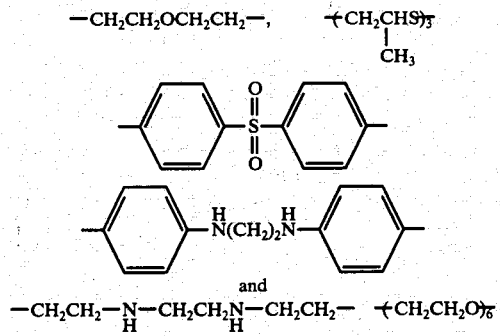

When R' is a Y-interrupted hydrocarbyl group, Y in various parts of the group does not have to be the same. For example, the following are embraced within the above definition of R':

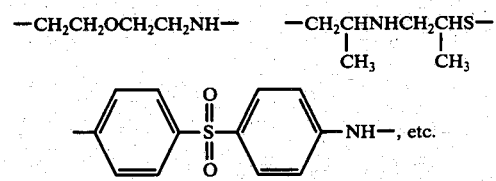

The Y group in the N-substituted morpholine formula given above can be an oxygen-, or nitrogen-containing group. Such groups include oxygen, divalent sulfur, tetravalent sulfur in the form of a sulfinyl group, hexavalent sulfur in the form of a sulfonyl group, or a divalent nitrogen in the form of a substituted or unsubstituted amino group. When Y is an amino group,

$R^3$ can be a hydrocarbyl group of at least one carbon atom or a hydrogen atom, or R". In certain cases $R^3$ can be R" and in others a $C_1$ to $C_{14}$ hydrocarbyl group. When $R^3$ is R" all the preference explained below during the discussion of R" apply.

Preferably $R^3$ is free of olefinic or acetylenic unsaturation and contains up to ten carbon atoms. More preferably $R^3$ is hydrogen or a $C_{1-8}$ alkyl or phenyl group. Examples of $R^3$ groups include methyl, ethyl, propyl, phenyl, benzyl, tolyl, cyclopentyl, octyl, isooctyl, heptyl, cyclohexyl, dodecyl, dodecenyl, etc.

The N-substituted morpholines present in the concentrates of the present invention contain at least one R" radical which is a hydrocarbyl radical of at least 15 carbon atoms. Preferably, R" will have at least 40 carbon atoms, and, more preferably, at least 70 carbon atoms. In a preferred embodiment it has no more than 1000 carbon atoms. In more preferred embodiments it has no more than 250 carbon atoms. The hydrocarbyl radicals R" can be derived from pure chemical compounds or from animal or plant sources such as tallow or coconut oil. They can also be derived from mineral sources such as cracked wax olefins, various petroleum oil fractions, etc. More preferably, however, they are derived from polymerization (or copolymerization) of a low molecular weight $C_1$-$C_8$ 1-monoolefin such as ethylene, propylene, 1- butene, 2-butene, isobutene, styrene, hexene, etc. Polymers of medial olefins of two to eight carbons can also be used. Examples are 2-1 -butene, 3-pentene and 4octene.

In certain preferred embodiments the R" group is derived from a halogenated hydrocarbon of at least 15 carbon atoms, wherein one or ore halogen atoms are directly bonded to aliphatic carbon atoms. Chlorinated and brominated hydrocarbons are preferred with chlorinated hydrocarbons being expecially preferred. Many such compounds are well known to those of the art. Specific examples include p- tertiary-octylbenzyl chloride, 1-iodo-pentadecane, 3-bromo- tricontane, 6-chloro-tetracontane, etc. Mixtures of such compounds can also be used.

As noted above, however, it is often preferred that R" be derived from an olefinic polymer of a low molecular weight 1-olefin; sometimes with an intermediate step of halogenating the polymer. Useful halogenated olefinic polymers have number average molecular weights ($\overline{M}n$) ranging from about 210 to about 100,000 (still higher molecular weight derivatives may be useful and actually preferred when it is desired that the N-substituted morpholines have viscosity improving properties in lubricating oil). Especially useful are halogenated polymers having minimum $\overline{M}n$'s of about 600. A preferred maximum $\overline{M}n$ is about 6000. Illustrative of such polymers are those halogenated polymers having $\overline{M}n$'s of 600, 800, 1900, 2500, 3000, etc.

Interpolymers of the afore-described $C_{2-8}$ olefins can also be used as a source of materials for the halogenated polymers of the present invention. Such interpolymers include, for example, those prepared by polymerizing isobutene with ethylene; ethylene with propylene; propylene with 1-butene; 1-octene with 1-hexene; 1-heptene with 1-pentene; 3-methyl-1-butene with 1-octene; etc.

The polymers used as a source of R" should preferably contain at least 80%, more preferably at least 95%, saturated units derived from an aliphatic monoolefin and no more than 5% olefinic linkages based on the total number of carbon-to-carbon covalent linkages present. Specific examples of such polymers include a homopolymer of isobutylene, a copolymer of ethylene (65%) and propylene, a copolymer of 95% isobutene with 5% allene; a terpolymer of 98% isobutene with 1% piperylene and 1% 1-pentene; a terpolymer of 95% isobutene with 2% 1-butene and 3% styrene; and terpolymer of 95% isobutene with 4% propene and 1% butadiene; a copolymer of 80% 1-hexene with 20% 1-heptene; a terpolymer of 90% isobutene with 2% cyclohexene and 8% propene; etc. (All percentages and parts in this specification and the appended claims are percentages by weight and parts by weight unless otherwise specified.)

Chlorinated and brominated polymers of butene, particularly of isobutene, are especially preferred sources of the R" radicals. Such polymers are conventiently obtained by polymerizing a butene such as isobutene with the use of a Friedel-Crafts catalyst such as aluminum chloride, boron trifluoride, titanium tetrachloride or the like. When commercial isobutene is used in the polymerization, the polymer may contain a small amount of polymerized units of 1-butene or 2-butene which are often present as impurities in commerical isobutene. For the purposes of this invention, a polyisobutene may thus contain small proportions of polymerized or interpolymerized 1-butene or 2-butene.

The halogenated hydrocarbons from which R" can be derived are conveniently prepared by treating suitable hydrocarbons, such as polymers described above, with halogenating agents such as chlorine, bromine, N-bromo-succinimide, N-iodo-phthalimide, etc. Such techniques are well- known to those of skill in this art. For example, the treatment can be carried out simply by contacting the hydrocarbon with the halogenating agent at a temperature from about 50° C., preferably from about 80° C., up to any temperature below the decomposition point of the reaction mixture. Usually such halogenations are carried out between 80° and 250° C., the exact temperature being determined by the precise nature of the halogenating agent and hydrocarbon to be halogenated. The relative amounts of hydrocarbon and halogenating agent used in the reaction are such as to provide incorporation of an average of at least about one atomic proportion of halogen per hydrocarbon molecule and up to about one atomic proportion of halogen per 25 aliphatic carbon atoms in the hydrocarbon molecules. Such amounts, in most instances, are about one mole of the hydrocarbon and at least about one mole of the halogenating agent.

Halogenated polymers useful for incorporating R" into the N-substituted morpholines used in this invention contain an average of at least one and often two or more, such as ten, atomic proportions of halogen per polymer molecule, especially in instances where the hydrocarbon is of relatively high molecular weight such as 1000 as higher. In most instances, the halogen contents of such halogenated hydrocarbons are between about 0.1% and 15%, preferably the minimum is about 2% and the maximum is about 9% of the total weight of the halogenated hydrocarbon. To form the more highly halogenated polymers, of course, two or more moles of the halogenating agent are used.

The halogenation can be carried out in the presence of a substantially inert solvent or diluent such as carbon tetrachloride, chloroform, chlorobenzene, benzene, etc. The reaction is often accompanied by the formation of hydrogen halide which may simply be allowed to escape from the reaction mixture as the treatment proceeds. The precise chemical composition of the halogenated polymer is not always known; it is known, however, that such product does, on the average, contain about one or more halogen substituents per molecule.

It is also possible to form a suitable halogenated polymer by interpolymerization of, e.g., isobutene, with a halogenated monomer such as chloroprene, vinyl, bromide, etc., by selecting a proper ratio of non-halogenated polymerizable olefin to polymerizable halo-olefin to achieve a halogen content in the interpolymer within the limits set forth above.

The method by which the halogen is incorporated into the olefin polymer is not critical to the practice of this invention. Hence, any method known to the art for halogenating hydrocarbons can be used and products of such methods are contemplated for use as reactants in this invention. Also, it is clear that mixtures of halogenated hydrocarbons can be used.

Many methods for making the N-substituted morpholines used in the concentrates of the present invention will be obvious to those of skill in the art. A particularly preferred method is to react an N-substituted morpholine intermediate of the structure O(CH$_2$CH$_2$)$_2$NR'YH with the afore-described halogenated polymer in a molar ratio of one substituted morpholine intermediate to about 1-14 2 moles of the halogenated polymer.

Such N-substituted morpholine intermediates can be made by a number of methods equally well known to those of skill in the art. For example, morpholine itself can be reacted in Michael Addition with the commercially plentiful acrylonitrile and the product obtained hydrogenated to provide N-3- aminopropyl morpholine. similarly, morpholine can be reacted with an epoxide such as ethylene oxide or propylene oxide or mixtures thereof to form poly-N-hydroxyalkylene morpholines such as

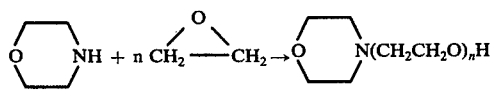

$n$ = 1 to about 6.

Similar reactions with episulfides and azeridines are also well known to those of skill in the art.

Morpholine can also be reacted with an appropriately substituted low molecular weight organo halide to produce the desired N-substituted morpholine intermediate, eg.,

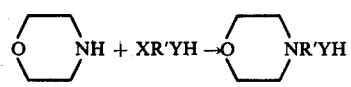

$x$ = halogen, R' and Y as defined above.

The reaction of the afore-described N-substituted morpholine intermediates with the afore-described halogenated hydrocarbon can be carried out by techniques well known to those of skill in the art using about 1 to about 2 moles of halogenated hydrocarbon per mole of N-substituted morpholine intermediate. Often it is preferable and convenient to have a halogen halide acceptor present during this reaction. Examples of such acceptors include metal and ammonium carbonates, bicarbonates, oxides, hydroxides, amines, (in particular, tertiary amines such as pyridines) and salts of organic acids such as salts of carboxylic acids, in particular, the alkali metal salts or alkaline earth metal salts of lower carboxylic acids.

Among the useful acceptors, preference is given to carbonates, bicarbonates, oxides and hydroxides, since upon reaction with the hydrogen halide formed during the reaction, in addition to metal halide and water, only carbon dioxide is formed. Although, in general, carbonate, bicarbonates, oxides and hydroxides of any metal are useful hydrogen halide acceptors, the alkali metal and alkaline earth metal compounds are preferred. In particular, sodium, potassium, lithium, calcium and magnesium salts are preferred. These hydrogen halide acceptors are preferably employed in quantities such that from about 1 to 2 gram equivalents of the acceptor is present in the reaction mixture per gram equivalent of the halogen present in the halogenated hydrocarbon. Generally, about 0.5 to about 2 moles of hydrogen halide acceptor per gram atom of halide present are used.

Generally, reacting the afore-described N-substituted morpholine intermediate with the halogenated hydrocarbon will offer no problems to those skill in the art. The reaction is preferably carried out in the presence of the afore-described hydrogen halide acceptor, in an inert solvent, at about 20° C. to about 250° C., for about 0.5 hour to about 24 hours, though these reaction temperatures and times can be varied according to the peculiarities of the specific reactants used.

Suitable substantially inert solvents or diluents for such reactions include relatively low boiling readily available hydrocarbon solvents such as pentane, heptane, benzene, toluene and xylene as well as oxygenated materials such as the lower alkanols and ketones and high boiling hydrocarbon materials such as processed and neutral oils, bright stocks and various other types of lubricating oil base stocks. If desired, the product can be recovered from such solvents or diluents by standard procedures such as distillation, evaporation, precipitation, etc. Alternatively, if the solvent or diluent is, for example, a lubricating oil base or a low molecular weight hydrocarbon, the product can be left in the solvent/diluent to form the desired concentrate.

The following examples are specifically preferred embodiments of the N-substituted morpholines used in the concentrates of the present invention.

EXAMPLE 1

A mixture of 17.75 parts of isopropyl alcohol, 17.75 parts xylene, 7.2 parts aminopropyl morpholine and 4.19 parts of a saturated aqueous solution of sodium hydroxide is heated to 75° C. To this mixture is slowly added over 1.5 hours 35.5 parts of a polyisobutenyl chloride having a $\overline{M}n$ of 1000 containing 5% chlorine. The reaction mixture is heated to 95°–98° C. for 5 and then stripped to a pot temperature of 175° C. over 9.5 hours. The organic phase is carefully decanted from the solids and the solids rinsed with xylene. The combined organic layers are vacuum stripped to 205° C./ 1mm Hg. Xylene (15.79 parts) is added to the residue to give a 70% active concentrate of desired product which can be filtered through diatomaceous earth to improve its clarity. The concentrate has a nitrogen content of 1.28% (Kjeldahl) to 1.51% (Dumas).

EXAMPLE 2

Example 2 is carried out in essentially the same fashion as Example 1, except twice as much chlorinated polyisobutene is used. The desired dihydrocarbyl-substituted aminopropyl morpholine is obtained.

EXAMPLE 3

A mixture of 139.4 parts of aminated N-ethoxylated morpholine containing on the average of four carbon atoms and two oxygen atoms in the ethoxyl substituent, and sold as Amine C-6 by the Jefferson Chemical Co., aqueous sodium hydroxide solution containing 24 parts of sodium hydroxide, 100 parts of isopropyl alcohol and 100 parts of xylene is heated under nitrogen to 70° C. Four hundred fifteen parts of polyisobutenyl chloride containing 4.3% chlorine and having a $\overline{M}n$ of 1300 is slowly added to the reaction mixture which is then heated to 160° C. for 7 hours. The mixture is filtered to remove solids and stripped to 155° C./1mm Hg. Diluent oil (190 parts) is added and the solution filtered through diatomaceous earth to provide the desired product as filtrate containing 30% diluent oil. This concentrate has a nitrogen content of 1.43%.

EXAMPLE 4

Example 4 is carried out in essentially the same fashion as Example 3 except that the polyisobutenyl chloride is replaced with a polyisobutenyl chloride having a $\overline{M}n$ of 300 and, on the average, one chlorine atom per molecule.

EXAMPLE 5

Chlorine gas is passed at a rate of 1.25 parts per minute through 500 parts of polyethylene of $\overline{M}n$ 2500 and $\overline{M}w$ (weight average molecular weight) of 5000 as measured by gel permeation chromatography. The polyethylene is held at 115° C.–124° C. under nitrogen and irradiated with light from a commercial sun lamp. Chlorination is contained for 1 hour and the polyethylene then purged with a nitrogen stream for 1 hour to give 531 parts of a chlorinated product.

A mixture of 100 parts of the chlorinated product described above and 24 parts of N-aminopropyl morpholine is heated at 190°–200° C. for 9 hours. A mixture of 125 parts xylene and 42 parts saturated aqueous sodium hydroxide is then added and the reaction mixture held at 100° –110° C. for 1 hour. The organic layer is separated, dried by azeotropic distillation and stripped to 180° C./15 mm Hg. Diluent oil (66 parts) is added and the mixture filtered through diatomaceous earth at 110° C. to give as the filtrate a 60% active solution of the desired N-substituted morpholine.

The N-substituted morpholines present in the concentrates of this invention are useful as additives for lubricant and fuel compositions where they function primarily as dispersants, that is, they maintain sludge and dirt which accumulate in the lubricant in suspension. In effect, they disperse such sludge and dirt.

The afore-described N-substituted morpholines can be diluted with an inert solvent/diluent such as mineral oil to form the additive concentrates of this invention. These concentrates generally contain about 20 to about 90 percent of N-substituted morpholine of this invention and can contain in addition any of the hereinbelow described prior art additives, particularly the hereinbelow described ashless dispersants in the aforesaid proportions.

A number of inert solvent/diluents useful in preparing the concentrates of this invention are known to those skilled in the art. Among them are aromatics such as "mixed xylenes" (i.e., a mixture of xylene isomers), toluene, benzene; alcohols such as isopropanol, isooctanol, 2-ethylhexanol; mineral oil fractions of the paraffinic and naphthenic type, particularly those having visosities of at least about 100 SUS at 100° F.; and refinery streams, particularly distillate streams of high aromatic content such as those commonly known as "reformate" (i.e., the product of catalytic reforming processes).

While often cheaper to use a single type of inert solvent/diluent, the use of mixtures is sometimes preferred for reasons of enhanced low temperature flow properties, solvency and diluency and so forth.

The concentrates of this invention are useful for treating various hydrocarbyl and oleaginous products. Among such products are liquid fuels such as gasoline, diesel fuel, heating oil, bunker fuel and so forth. Liquid fuels derived from coal, shale, organic refuse, agricultural products and the like can also be treated with these concentrates as can be fuels containing ethers, alcohols, ketones, esters organo-nitro compounds, etc.

Also among the products that can be treated with concentrates of this invention are oils such as lubricating oils, functional fluids, (e.g., hydraulic oils, gear oils, transmission oils) and so forth. A number of oils and their specific nature are disclosed in the parent of this application, U.S. application Ser. No. 480,767 filed June 19, 1974, which is hereby incorporated by reference, particularly for its disclosures relating to the preparation and use of lubricants and fuels which can be made from the additive concentrates of this invention.

The concentrates of the present invention can contain, in addition to the N-substituted morpholines of this invention, other additives that are normally used in lubricants. Such additives include, for example, auxiliary detergents of the ash-forming and of the ashless type, viscosity index improving agents, pour-point depressants, anti-foam agents, extreme pressure agents, rust-inhibiting agents, oxidation and corrosion inhibiting agents.

In a preferred embodiment of the present invention, the afore-described N-substituted morpholines are combined in a concentrate with an ashless dispersant. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645, British Pat. Nos. 981,850 and 1,055,337 and U.S. Pat. Nos. 3,255,108; 3,311,558; 3,331,776; 3,346,354; 3,522,179; 3,579,450; 3,542,680; 3,381,022; 3,639,242; 3,697,428; 3,708,522; and British patent specification No. 1,306,529. These patents are expressly incorporated herein by reference for their disclosure of suitable esters and methods for their preparation. Generally, the weight ratio of the N-substituted morpholines of this invention to the aforesaid ashless dispersants is about 0.1 to about 10.0, preferably about one to about ten parts of morpholine to one part ashless dispersant. In still another embodiment of this invention, the inventive additives are combined in concentrates with Mannich condensation products formed from substituted phenols, aldehydes, polyamines, and substituted pyridines. Such condensation products are described in U.S. Pat. Nos. 3,649,659; 3,558,743; 3,539,633; 3,704,308 and 3,725,277.

The concentrate formulations of the present invention are exemplified by the following:

EXAMPLE 6

A concentrate for use in blending lubricating oils comprises 50% of the mineral oil of Example 3 and 50% of the product described in Example 1.

The concentrates of this invention, as well as processes for preparing the morpholines they contain, have been specifically set forth above to aid those skilled in the art in understanding and practicing the invention. Many obvious variations and departures from the specific disclosure will be apparent to those of skill in the art based on principles and teachings herein and in the prior art. Such variations and departures are contemplated as being within the scope of the present invention as define by the appended claims.

I claim:

1. An additive concentrate comprising an inert solvent/diluent containing about 20% to about 90% of at least one N-substituted morpholine of the formula $$O(CH_2CH_2)_2NR'YR''$$

wherein R' is a hydrocarbyl or hydrocarbyl interrupted with Y group of at least one to about thirty carbon atoms, Y is 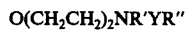

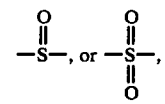

R'' being a hydrocarbyl radical of at least 15 carbon atoms.

2. A concentrate as claimed in claim 1 wherein R' is a $C_1$-$C_3$ aliphatic radical.

3. A concentrate as claimed in claim 1 wherein R'' contains at least about 40 carbon atoms.

4. A concentrate as claimed in claim 1 wherein R'' is derived from at least one member of the group of $C_{2-8}$ monoolefin polymers and halogenated $C_{2-8}$ monoolefin polymers and contains at least about 40 carbon atoms.

5. A concentrate as claimed in claim 1 wherein Y is —O— and R' is —$CH_2CH_2CH_2$—.

6. A concentrate as claimed in claim 1 wherein Y is —O—.

7. A concentrate as claimed in claim 6 wherein R'' contains at least about 40 carbon atoms.

* * * * *